US012434141B2

(12) United States Patent
Dobrikov et al.

(10) Patent No.: US 12,434,141 B2
(45) **Date of Patent: *Oct. 7, 2025**

(54) INTERACTIVE AUDIOVISUAL SYNCHRONIZATION FOR VENUES

(71) Applicant: Sphere Entertainment Group, LLC, New York, NY (US)

(72) Inventors: Andrey Dobrikov, Brooklyn, NY (US); Sarah Huth, Edison, NJ (US); Aaron Pulkka, New York, NY (US); Benjamin Poynter, New York, NY (US)

(73) Assignee: Sphere Entertainment Group, LLC, New York, NY (US)

(*) Notice: Subject to any disclaimer, the term of this patent is extended or adjusted under 35 U.S.C. 154(b) by 0 days.

This patent is subject to a terminal disclaimer.

(21) Appl. No.: 17/237,808

(22) Filed: Apr. 22, 2021

(65) Prior Publication Data

US 2022/0339536 A1 Oct. 27, 2022

(51) Int. Cl.
*A63F 13/44* (2014.01)
*A63F 13/215* (2014.01)
(Continued)

(52) U.S. Cl.
CPC ............ *A63F 13/44* (2014.09); *A63F 13/215* (2014.09); *A63F 13/216* (2014.09); *A63F 13/217* (2014.09); *A63F 13/22* (2014.09); *A63F 13/27* (2014.09); *H04W 4/025* (2013.01); *H04W 4/33* (2018.02); *A63F 2300/403* (2013.01);
(Continued)

(58) Field of Classification Search
CPC ...... A63F 13/44; A63F 13/215; A63F 13/216; A63F 13/217; A63F 13/22; A63F 13/27; A63F 2300/403; A63F 2300/5573; A63F 2300/8047; H04W 4/025; H04W 4/33
See application file for complete search history.

(56) References Cited

U.S. PATENT DOCUMENTS 5,552,839 A * 9/1996 Kuhl ........................ A63F 13/25 348/766
7,320,643 B1 * 1/2008 Brosius ................. A63F 13/245 463/7

(Continued)

*Primary Examiner* — Carl V Larsen
(74) *Attorney, Agent, or Firm* — Sterne, Kessler, Goldstein &Fox P.L.L.C.

(57) ABSTRACT

Exemplary venues allow for members of an audience at different locations within these venues to simultaneously interact with an interactive content. The interactive content can convey one or more requisite actions to be performed by the members of the audience. However, the one or more requisite actions can reach members of the audience at different instances in time. These exemplary venues can effectively compensate for these different instances in time such that the accuracy and/or the synchronization of one or more response actions, which are performed by the members of the audience in response to the one or more requisite actions, can be characterized as no longer being dependent upon their distance from the interactive content. Rather, the accuracy and/or the synchronization of the one or more response actions by the members of the audience to the one or more requisite actions can be considered as being related to the performance, for example, timing, of the one or more response actions themselves.

20 Claims, 7 Drawing Sheets

(51) Int. Cl.

| | |
|---|---|
| ***A63F 13/216*** | (2014.01) |
| ***A63F 13/217*** | (2014.01) |
| ***A63F 13/22*** | (2014.01) |
| ***A63F 13/27*** | (2014.01) |
| ***H04W 4/02*** | (2018.01) |
| ***H04W 4/33*** | (2018.01) |

(52) U.S. Cl.
CPC ................. *A63F 2300/5573* (2013.01); *A63F 2300/8047* (2013.01)

(56) References Cited

U.S. PATENT DOCUMENTS

| | | | | |
|---|---|---|---|---|
| 8,149,530 | B1 * | 4/2012 | Lockton | A63F 13/795 381/103 |
| 8,606,958 | B1 * | 12/2013 | Evans | H04L 47/22 709/233 |
| 8,861,925 | B1 * | 10/2014 | Ohme | H04N 5/76 386/207 |
| 11,202,162 | B2 * | 12/2021 | Elby | G06F 3/165 |
| 11,247,125 | B2 * | 2/2022 | Kamphuis | A63F 13/335 |
| 2003/0130039 | A1 * | 7/2003 | Nelson | G07F 17/323 463/16 |
| 2007/0249420 | A1 * | 10/2007 | Randall | A63F 13/332 463/40 |
| 2014/0274415 | A1 * | 9/2014 | Benzon | H04N 21/8173 463/42 |
| 2015/0133173 | A1 * | 5/2015 | Edge | G01S 5/08 455/456.6 |
| 2016/0353252 | A1 * | 12/2016 | Krasadakis | H04L 12/1845 |
| 2017/0135057 | A1 * | 5/2017 | Cugini | H05B 47/10 |
| 2017/0180438 | A1 * | 6/2017 | Persson | G10L 21/055 |
| 2018/0249359 | A1 * | 8/2018 | Woods | C12Q 1/6874 |
| 2019/0105568 | A1 * | 4/2019 | Platt | A63F 13/52 |
| 2019/0200436 | A1 * | 6/2019 | Den Hartog | H05B 47/105 |
| 2021/0379470 | A1 * | 12/2021 | Matonti | G09B 19/0038 |
| 2022/0108358 | A1 * | 4/2022 | Sun | G06Q 30/0631 |
| 2022/0339536 | A1 * | 10/2022 | Dobrikov | A63F 13/814 |

* cited by examiner

INTERACTIVE AUDIOVISUAL SYNCHRONIZATION FOR VENUES

BACKGROUND

The popularity of rhythm video games is ever increasing. This genre of video games can solicit participation from a player to perform one or more actions relating to, for example, hand-eye coordination and/or reaction-time. Often times, these actions can include pressing one or more pre-determined sequences of one or more action buttons and/or one or more omnidirectional control sticks or buttons at precise times to simulate performance of musical instruments while a musical scene is being conveyed. Rhythm video games can thereafter provide the player with awards for accuracy and/or for synchronization with the beat of the musical scene.

BRIEF DESCRIPTION OF THE DRAWINGS/FIGURES

The accompanying drawings, which are incorporated herein and form a part of the specification, illustrate the present disclosure and, together with the description, further serve to explain the principles thereof and to enable a person skilled in the pertinent art to make and use the same.

Figure 5:
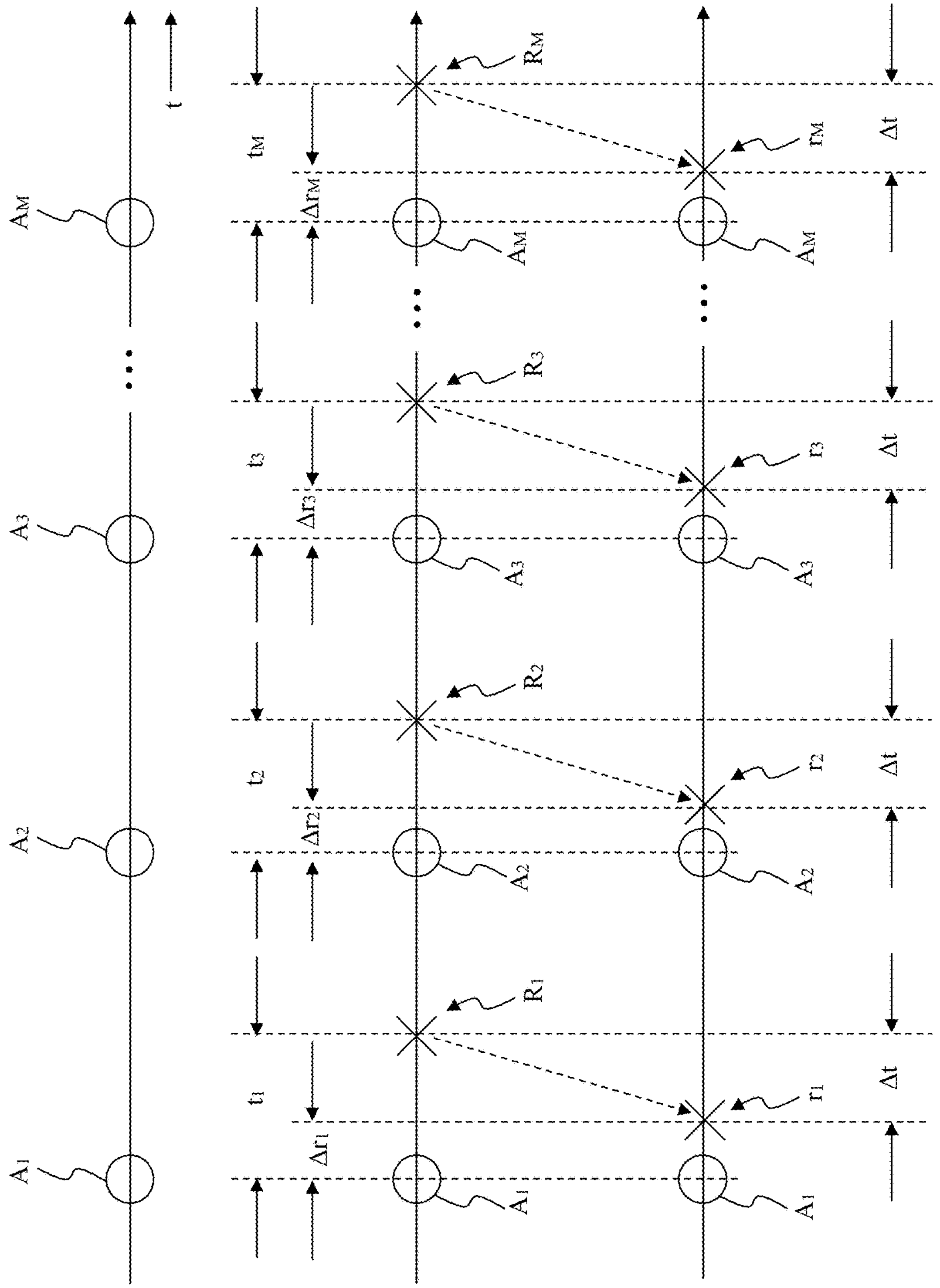
Figure 6:
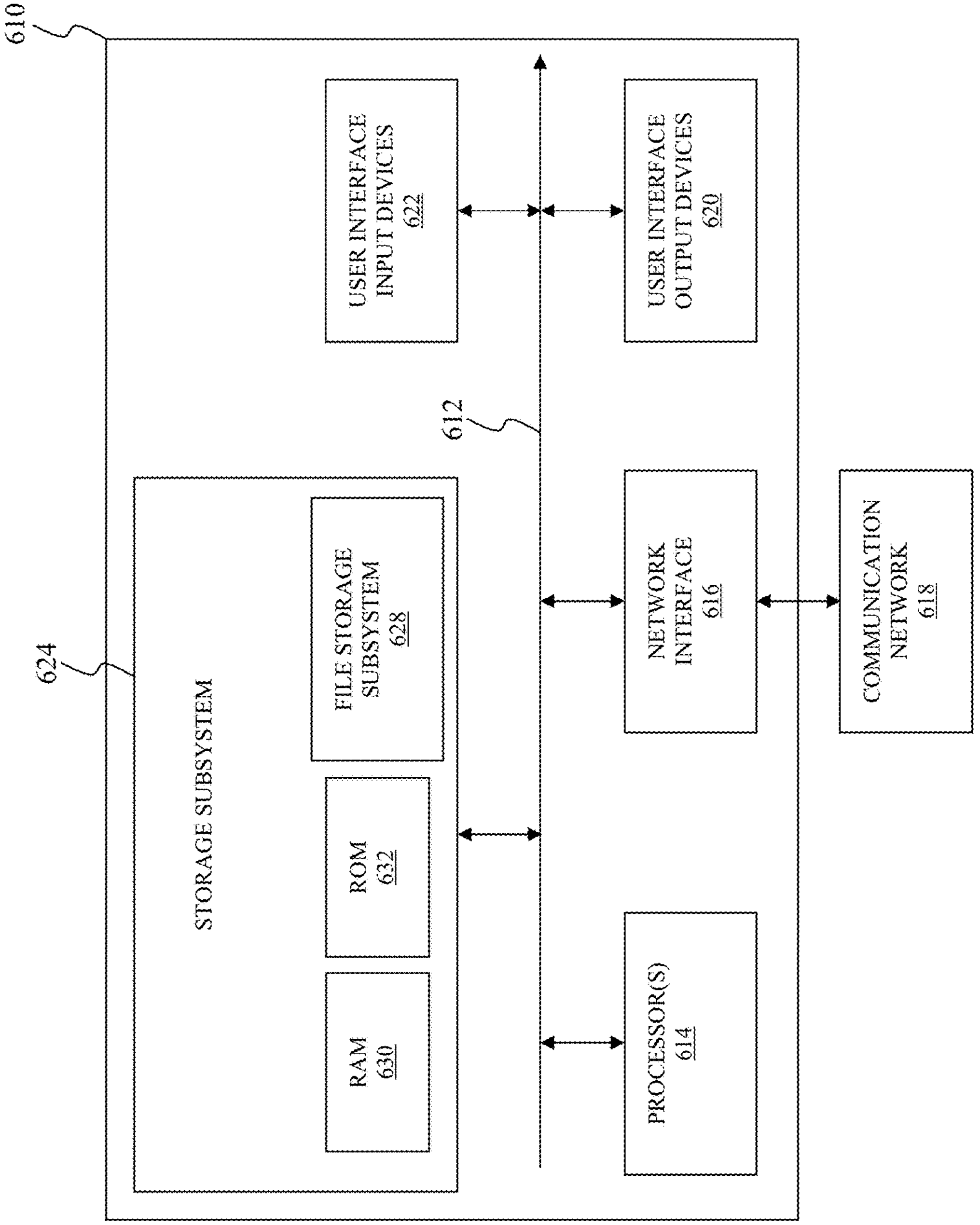

FIG. 5 graphically illustrates the exemplary calibration operation according to some exemplary embodiments of the present disclosure; and FIG. 6 graphically illustrates a simplified block diagram of a computer system suitable for use with embodiments described herein according to some exemplary embodiments of the present disclosure.

DETAILED DESCRIPTION

The following disclosure provides many different embodiments, or examples, for implementing different features of the provided subject matter. Specific examples of components and arrangements are described below to simplify the present disclosure. These are, of course, merely examples and are not intended to be limiting. For example, the formation of a first feature over a second feature in the description that follows may include embodiments in which the first and second features are formed in direct contact, and may also include embodiments in which additional features may be formed between the first and second features, such that the first and second features may not be in direct contact. In addition, the present disclosure may repeat reference numerals and/or letters in the examples. This repetition does not in itself dictate a relationship between the embodiments and/or configurations discussed.

Overview

The detailed description to follow is to describe exemplary venues allowing for the members of the audience at different locations within these venues to simultaneously interact with an interactive content. As to described in further detail below, the interactive content can solicit participation from the members of the audience to perform one or more requisite actions relating to, for example, hand-eye coordination and/or reaction-time. However, as to be described in further detail below, the one or more requisite actions presented by the interactive content can reach the members of the at different instances in time. As to be described in further detail below, these exemplary venues can effectively compensate for these different instances in time such that the accuracy and/or the synchronization of one or more response actions, which are performed by the members of the audience in response to the one or more requisite actions, can be characterized as no longer being dependent upon their distance from the interactive content. Rather, as to be described in further detail below, the accuracy and/or the synchronization of the one or more response actions by the members of the audience to the one or more requisite actions can be considered as being related to the performance, for example, timing, of the one or more response actions themselves.

First Exemplary Venue

Figure 1:
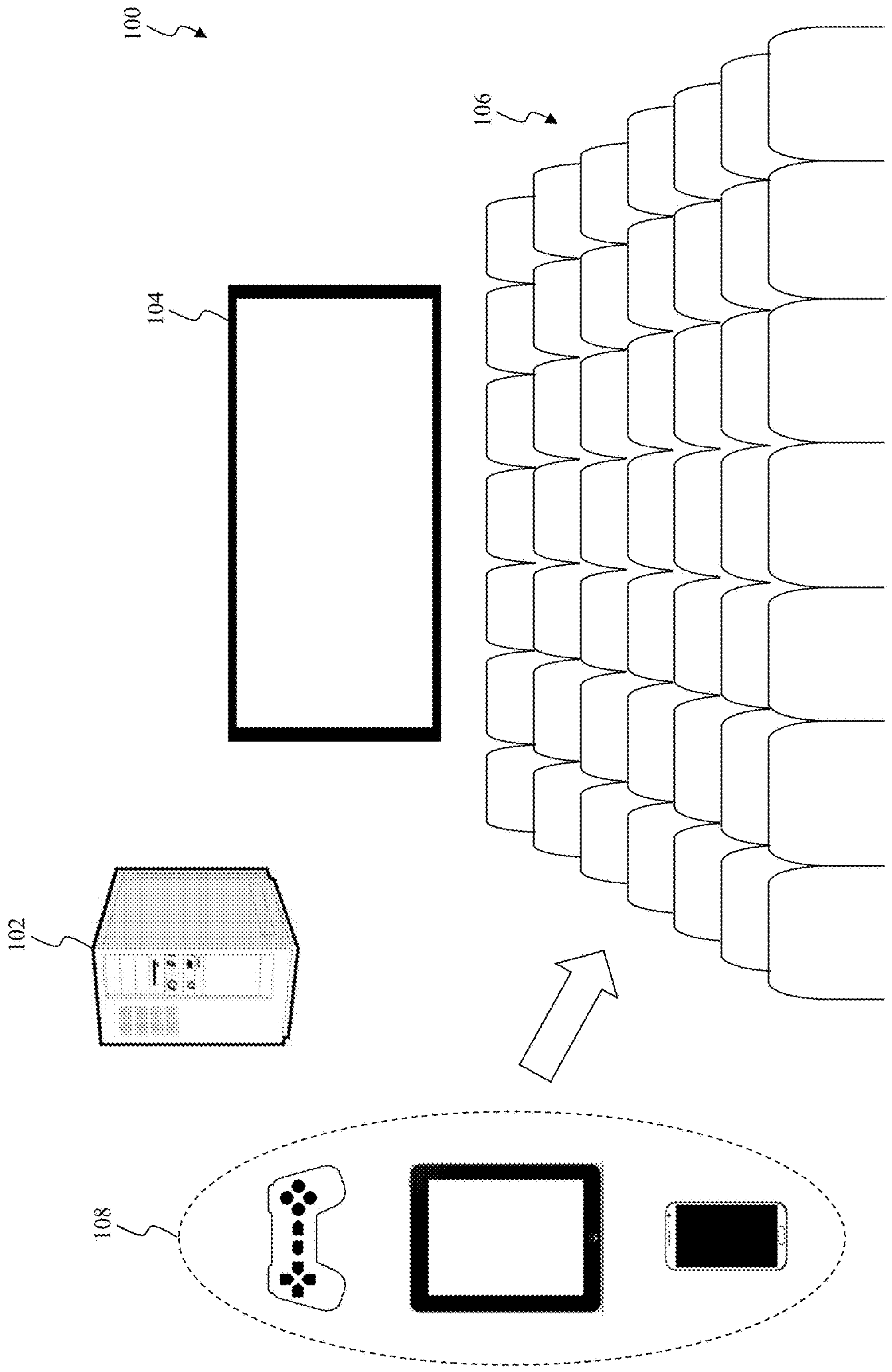
FIG. 1 illustrates a pictorial representation of an exemplary first venue according to some exemplary embodiments of the present disclosure.

FIG. 1 illustrates a pictorial representation of an exemplary first venue according to some exemplary embodiments of the present disclosure. In the exemplary embodiment illustrated in FIG. 1, a venue 100 represents a location for hosting an event. For example, the venue 100 can represent a music venue, for example, a music theater, a music club, and/or a concert hall, a sporting venue, for example, an arena, a convention center, and/or a stadium, and/or any other suitable venue that will be apparent to those skilled in the relevant (s) without departing the spirit and scope of the present disclosure. The event can represent a musical event, a theatrical event, a sporting event, a motion picture, and/or any other suitable event that will be apparent to those skilled in the relevant (s) without departing the spirit and scope of the present disclosure. In the exemplary embodiment illustrated in FIG. 1, the venue 100 can present interactive content to members of an audience within the venue 100.

Generally, the interactive content can solicit participation from the members of the audience to perform one or more response actions relating to, for example, hand-eye coordination and/or reaction-time, which are performed by the members of the audience in response to one or more requisite actions. In some embodiments, the interactive content can convey the one or more requisite actions to the members of the audience through various visual representations and/or audible representations. In these embodiments, the interactive content can present these representations to the members of the audience to effectively signal the members of the audience to perform these actions. However, as to be described in further detail below, the one or more requisite actions can reach the members of the audience at different instances in time. In some embodiments, the members of the audience can receive the visual representations and/or the audible representations presented by the interactive content at different instances in time. For example, the one or more requisite actions can reach those members that are seated further away from the interactive content at later instances in time than those members that are seated closer to the interactive content. As a result, those members that are seated further away from the interactive content often perform their response actions later in time which can effectively diminish accuracy and/or synchronization of their response actions to the one or more requisite actions conveyed by the interactive content. As to be described in further detail below, the venue 100 can effectively compensate for these different instances in time such that the accuracy and/or the synchronization of the one or more response actions of the members of the audience can be characterized as no longer being dependent upon their distance from the interactive content. Rather, as to be described in further detail below, the accuracy and/or the synchronization of the one or more response actions of the members of the audience can be considered as being related to the performance, for example, timing, of the one or more response actions themselves.

As illustrated in FIG. 1, the venue 100 can include a content server 102, an audio/visual system 104, an audience 106, and/or portable electronic devices 108. In the exemplary embodiment illustrated in FIG. 1, the content server 102 represents one or more computer systems, an exemplary embodiment of which is to be described in further detail below, which facilitate operation of the venue 100. In some embodiments, the content server 102 can be implemented in hardware, firmware, software, or any combination thereof. Further, firmware, software, routines, instructions, and/or applications can be described herein as performing certain actions. However, it should be appreciated that such descriptions are merely for convenience and that these actions result from computing devices, processors, controllers, or other devices executing the firmware, software, routines, instructions, and/or applications. As illustrated in FIG. 1, the content server 102 can provide the interactive content, as described above, to the audio/visual system 104 for presentation to the members of the audience 106. In some embodiments, the interactive content can include one or more genres of video games, such as action video games, adventure video games, fighting video games, platform video games, puzzle video games, racing video games, role-playing video games, rhythm video games, shooter video games, simulation video games, sports video games, strategy video games, and/or any other suitable genres of video games that solicits direct and/or active participation of the members of the audience 106 that will be apparent to those skilled in the relevant art(s) without departing from the spirit and scope of the present disclosure. In some embodiments, the interactive content can alternatively, or additionally, include other interactive content, such as interactive surveys and/or interactive polls to provide some examples, to acquire various information from the members of the audience 106.

As described above, the interactive content can convey the one or more requisite actions to be performed by the members of the audience 106. In some embodiments, the one or more requisite actions can include pressing one or more pre-determined sequences of one or more action buttons and/or one or more omnidirectional control sticks or buttons at precise times to provide an example. In the exemplary embodiment illustrated in FIG. 1, the audio/visual system 104 can present the one or more requisite actions to be performed by the members of the audience 106. In some embodiments, the audio/visual system 104 can include one or more visual displays and/or one or more auditory speakers to present the interactive content to the members of the audience 106. The one or more visual displays can include one or more light-emitting diode (LED) displays, one or more organic light-emitting diode (OLED) displays, and/or one or more quantum dots (QDs) displays to provide some examples to present the visual representations of the interactive content to the members of the audience 106. The one or more auditory speakers can include one or more super tweeters, one or more tweeters, one or more mid-range speakers, one or more woofers, one or more subwoofers, and/or one or more full-range speakers to provide some examples to present the audible representations of the interactive content to the members of the audience 106. In an exemplary embodiment, the audio/visual system 104 can be configured and arranged as described in U.S. patent application Ser. No. 16/898,142, filed on Jun. 10, 2020, which is incorporated herein by reference in its entirety.

In the exemplary embodiment illustrated in FIG. 1, the portable electronic devices 108 can be manipulated by the members of the audience 106 to perform the one or more response actions in response to the one or more requisite actions. In some embodiments, the portable electronic devices 108 can include one or more mobile telephony devices, such as mobile phones, mobile computing devices, mobile internet devices, such as tablet computers and/or laptop computers, game controllers; and/or other suitable mechanical, electrical, or electromechanical input devices that will be recognized by those skilled in the relevant art(s) without departing from the spirit and scope of the present disclosure. In these embodiments, the game controllers can include gamepads, paddles, joysticks, trackballs, throttle quadrants, steering wheels, yokes, pedals, touchscreens, motion controllers, light guns, and/or rhythm game controllers to provide some examples. In the exemplary embodiment illustrated in FIG. 1, the portable electronic devices 108 can include the one or more action buttons and/or the one or more omnidirectional control sticks or buttons that can be manipulated by the members of the audience 106 to perform the one or more requisite actions conveyed by the audio/visual system 104. In some embodiments, the one or more action buttons and/or the one or more omnidirectional control sticks or buttons can represent mechanical, electrical, or electromechanical buttons integrated within the portable electronic devices 108 and/or virtual buttons that are displayed by the portable electronic devices 108. In some embodiments, the members of the audience 106 can manipulate, for example, move or press, the one or more action buttons and/or the one or more omnidirectional control sticks or buttons to perform the one or more requisite actions conveyed by the audio/visual system 104. In some embodiments, the one or more requisite actions conveyed by the audio/visual system 104 can include performing one or more pre-determined sequences of the one or more action buttons and/or the one or more omnidirectional control sticks or buttons by the members of the audience 106.

In the exemplary embodiment illustrated in FIG. 1, the portable electronic devices 108 can communicate the one or more response actions of the members of the audience 106 to the content server 102 for analysis. In some embodiments, the portable electronic devices 108 can generate and/or communicate action information relating to the one or more pressings of the one or more action buttons and/or one or more movements of the one or more omnidirectional control sticks or buttons by the members of the audience 106 in performing the one or more requisite actions conveyed by the audio/visual system 104. In some embodiments, the action information can identify which action buttons from among the one or more action buttons have been pressed by the members of the audience 106 and/or which omnidirectional control sticks from among the one or more omnidirectional control sticks or buttons have been moved the by members of the audience 106. In these embodiments, the action information can identify specific directions of the movement of the one or more omnidirectional control sticks or button by the members of the audience 106. In some embodiments, this action information can include one or more timestamps indicating one or more instances in time when the one or more action buttons have been pressed by the members of the audience 106 and/or the one or more omnidirectional control sticks have been moved the by members of the audience 106.

After receiving the action information from the portable electronic devices 108, the content server 102 can estimate the accuracy and/or for synchronization of the one or more response actions of the members of the audience 106 in relation to the one or more requisite actions conveyed by the audio/visual system 104. As described above, the one or more requisite actions conveyed by the audio/visual system 104, namely, the visual representations and/or the audible representations presented by the audio/visual system 104, can reach members of the members of the audience 106 at different instances in time based upon locations of the members of the audience 106 within the venue 100 as described above. In the exemplary embodiment illustrated in FIG. 1, the visual representations can propagate at a much faster velocity, namely, at the speed of light, as compared to the audible representations, namely, at the speed of sound. As such, the different instances in time that the members of the audience can receive the visual representations can be characterized as being negligible when considering the distance between the audio/visual system 104 and the members of the members of the audience 106 relative to the speed of light. In some embodiments, the content server 102 can ignore the different instances in time that the members of the audience 106 receive the visual representations as these different instances in time typically do not significantly impact the accuracy and/or the synchronization of the one or more response actions of the members of the audience 106 in relation to the one or more requisite actions conveyed by the audio/visual system 104. In these embodiments, the different instances in time that the members of the audience 106 receive the audible representations can be characterized as noticeably impacting the accuracy and/or the synchronization of the one or more response actions of the members of the audience 106 in relation to the one or more requisite actions conveyed by the audio/visual system 104 when considering the distance between the audio/visual system 104 and the members of the audience 106 relative to the speed of sound. As such, the content server 102 can effectively compensate for the different instances in time that the audible representations reach the members of the audience 106. In the exemplary embodiment illustrated in FIG. 1, the content server 102 can effectively compensate for these different instances in time such that the members of the audience 106 can be considered as effectively receiving the audible representations at substantially similar instances in time. However, those skilled in the relevant art(s) will recognize that the content server 102 can effectively compensate for the different instances in time that the visual representations reach the members of the audience 106 in a substantially similar manner without departing from the spirit and scope of the present disclosure. This compensation effectively decouples the one or more response actions performed by the members of the audience 106 from their distances from the audio/visual system 104 allowing the accuracy and/or the synchronization of the one or more response actions of the members of the audience 106 to be related to the performance, for example, timing, of the one or more response actions themselves.

As part of compensation, the content server 102 can identify locations of the portable electronic devices 108 within the venue 100. In some embodiments, the portable electronic devices 108 can utilize any suitable conventional location determination technique, such as global positioning to provide an example, that will be apparent to those skilled in the relevant art(s) without departing from the spirit and scope of the disclosure to determine the locations of the portable electronic devices 108 within the venue 100. In these embodiments, the portable electronic devices 108 can thereafter communicate their locations within the venue 100 to the content server 102. In some embodiments, the content server 102 can estimate one or more characteristics, parameters, and/or attributes, such as Angle of Arrival (AoAs) and/or Time of Flight (TOF) to provide some examples, of signals being communicated by the portable electronic devices 108 to the content server 102. In these embodiments, the content server 102 can thereafter estimate the locations of the portable electronic devices 108 within the venue 100 from these characteristics, parameters, and/or attributes. In some embodiments, the content server 102 can utilize one or more characteristics, parameters, and/or attributes associated with the venue 100, such as an audience seating arrangement to provide an example, to identify the locations of the portable electronic devices 108 within the venue 100. In these embodiments, the members of the audience 106 can enter one or more characteristics, parameters, and/or attributes relating to their seating arrangement within the venue 100, for example, row, section, and/or seat numbers, into the portable electronic devices 108 which are thereafter communicated to the content server 102. In these embodiments, the content server 102 can identify the locations of the portable electronic devices 108 within the venue 100 by comparing these characteristics, parameters, and/or attributes with a venue floorplan that associates these characteristics, parameters, and/or attributes with their locations within the venue 100. In some embodiments, the content server 102 can utilize one or more characteristics, parameters, and/or attributes associated with the portable electronic devices 108 to estimate the locations of the portable electronic devices 108 within the venue 100.

After identifying the locations of the portable electronic devices 108, the content server 102 estimates one or more durations in time, referred to as flight times, for the one or more requisite actions to reach the portable electronic devices 108 based upon the locations of the portable electronic devices 108 within the venue 100. In the exemplary embodiment illustrated in FIG. 1, the one or more flight times represent one or more durations in time needed for the one or more requisite actions to propagate from the audio/visual system 104 onto the members of the audience 106. In some embodiments, the content server 102 estimates one or more audible durations in time, referred to as audible flight times, for the portable electronic devices 108 based upon the locations of the portable electronic devices 108 within the venue 100. However, those skilled in the relevant art(s) will recognize that the content server 102 can the estimate one or more visual durations in time, referred to as visual flight times, for the portable electronic devices 108 based upon the locations of the portable electronic devices 108 within the venue 100 in a substantially similar manner without departing from the spirit and scope of the present disclosure. In the exemplary embodiment illustrated in FIG. 1, the one or more audible flight times represent one or more durations in time needed for the audible representations to propagate from the audio/visual system 104 onto the members of the audience 106. In some embodiments, the content server 102 can estimate the one or more audible flight times for one or more characteristics, parameters, and/or attributes of the venue 100, such as one or more seats, one or more rows, one or more sections, and/or elsewhere within the venue 100 to provide some examples. Thereafter, the content server 102 can time-shift the one or more response actions of the members of the audience 106 by their corresponding audible flight times to compensate for the different instances in time that the members of the audience 106 received the audible representations. However, those skilled in the relevant art(s) will recognize that the content server 102 can time-shift the one or more response actions of the members of the audience 106 by their corresponding visual flight times to compensate for the different instances in time that the members of the audience 106 received the visual representations in a substantially similar manner without departing from the spirit and scope of the present disclosure. In some embodiments, the content server 102 can reduce, or subtract, the timestamps of the one or more response actions of the members of the audience 106 from the one or more audible flight times to compensate for the different instances in time.

After compensating for the different instances in time, the content server 102 can thereafter grant the members of the audience 106 various awards for accuracy and/or for synchronization of their time-shifted response actions in relation to the one or more requisite actions conveyed by the audio/visual system 104. In some embodiments, the content server 102 can store a response action timeline specifying the one or more requisite actions to be performed by the members of the audience 106 and/or a timeline when these actions is to be performed by the members of the audience 106. In these embodiments, the content server 102 can compare the time-shifted response actions to the response action timeline to determine the accuracy and/or the synchronization of the time-shifted response actions in relation to the one or more requisite actions conveyed by the audio/visual system 104. In some embodiments, these awards can include points or even specialized awards provided by the venue 100 ranging from free items at the venue 100 to free admission to a future event. In some embodiments, the content server 102 can communicate these awards to the audio/visual system 104 and/or the portable electronic devices 108 for display to the members of the audience 106.

Second Exemplary Venue

Figure 2:
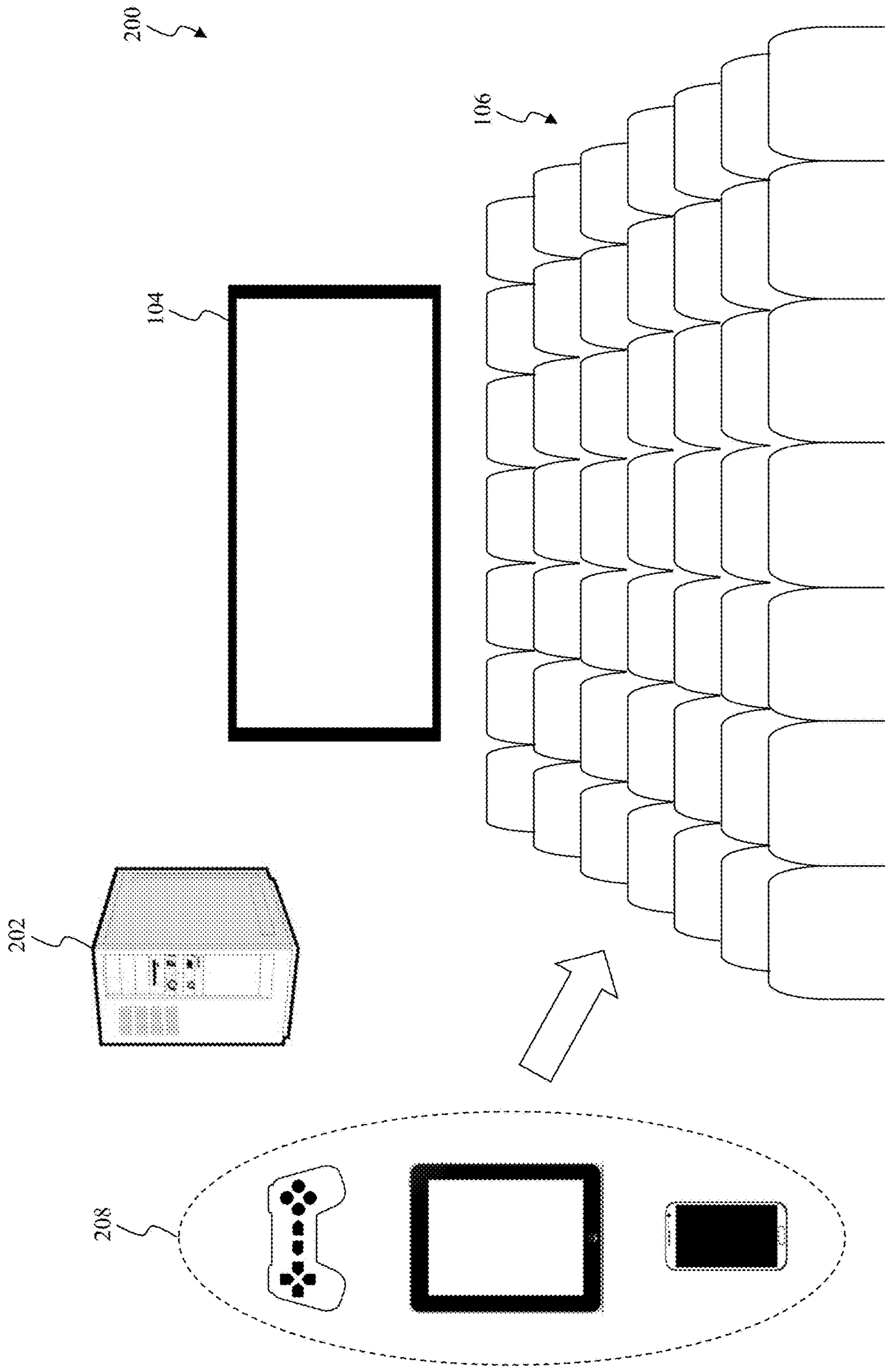
FIG. 2 illustrates a pictorial representation of an exemplary second venue according to some exemplary embodiments of the present disclosure.

FIG. 2 illustrates a pictorial representation of an exemplary second venue according to some exemplary embodiments of the present disclosure. In the exemplary embodiment illustrated in FIG. 2, a venue 200 represents a location for hosting an event. For example, the venue 200 can represent a music venue, for example, a music theater, a music club, and/or a concert hall, a sporting venue, for example, an arena, a convention center, and/or a stadium, and/or any other suitable venue that will be apparent to those skilled in the relevant (s) without departing the spirit and scope of the present disclosure. The event can represent a musical event, a theatrical event, a sporting event, a motion picture, and/or any other suitable event that will be apparent to those skilled in the relevant (s) without departing the spirit and scope of the present disclosure. In the exemplary embodiment illustrated in FIG. 2, the venue 200 can present interactive content to members of an audience within the venue 200. In the exemplary embodiment illustrated in FIG. 2, the venue 200 shares many substantially similar features as the venue 100 as described above in FIG. 1; therefore, only differences between the venue 200 and the venue 100 are to be described in further detail below.

As illustrated in FIG. 2, the venue 200 can include the audio/visual system 104 and the audience 106 as described above in FIG. 1 and a content server 202 and/or portable electronic devices 208. In the exemplary embodiment illustrated in FIG. 2, the content server 202 represents one or more computer systems, an exemplary embodiment of which is to be described in further detail below, which facilitate operation of the venue 200. In some embodiments, the content server 202 can be implemented in hardware, firmware, software, or any combination thereof. Further, firmware, software, routines, instructions, and/or applications can be described herein as performing certain actions. However, it should be appreciated that such descriptions are merely for convenience and that these actions result from computing devices, processors, controllers, or other devices executing the firmware, software, routines, instructions, and/or applications. As illustrated in FIG. 2, the content server 202 can provide the interactive content, as described above, to the audio/visual system 104 for presentation to the members of the audience 106 in a substantially similar manner as described above in FIG. 1. In the exemplary embodiment illustrated in FIG. 1, the audio/visual system 104 can convey the one or more requisite actions to be performed by the members of the audience 106 in a substantially similar manner as described above in FIG. 1.

In the exemplary embodiment illustrated in FIG. 2, the content server 202 can effectively compensate for the different instances in time that the one or more requisite actions reach the members of the audience 106 in a substantially similar manner as described above in FIG. 1. As part of compensation, the content server 202 can identify locations of the portable electronic devices 208 within the venue 200 in a substantially similar manner as described above in FIG. 1. After identifying the locations of the portable electronic devices 208, the content server 202 estimates one or more durations in time, referred to as flight times, for the one or more requisite actions to reach the portable electronic devices 208 based upon the locations of the portable electronic devices 208 within the venue 200 in a substantially similar manner as described above in FIG. 1.

In the exemplary embodiment illustrated in FIG. 2, the portable electronic devices 208 can be manipulated by the members of the audience 106 to perform the one or more response actions in response to the one or more requisite actions. In some embodiments, the portable electronic devices 208 can include one or more mobile telephony devices, such as mobile phones, mobile computing devices, mobile internet devices, such as tablet computers and/or laptop computers, game controllers; and/or other suitable mechanical, electrical, or electromechanical input devices that will be recognized by those skilled in the relevant art(s) without departing from the spirit and scope of the present disclosure. In these embodiments, the game controllers can include gamepads, paddles, joysticks, trackballs, throttle quadrants, steering wheels, yokes, pedals, touchscreens, motion controllers, light guns, and/or rhythm game controllers to provide some examples. In the exemplary embodiment illustrated in FIG. 2, the portable electronic devices 208 can include the one or more action buttons and/or the one or more omnidirectional control sticks or buttons that can be manipulated by the members of the audience 106 to perform the one or more requisite actions conveyed by the audio/visual system 104. In some embodiments, the one or more action buttons and/or the one or more omnidirectional control sticks or buttons can represent mechanical, electrical, or electromechanical buttons integrated within the portable electronic devices 208 and/or virtual buttons that are displayed by the portable electronic devices 208. In some embodiments, the members of the audience 106 can manipulate, for example, move or press, the one or more action buttons and/or the one or more omnidirectional control sticks or buttons to perform the one or more requisite actions conveyed by the audio/visual system 104. In some embodiments, the one or more requisite actions conveyed by the audio/visual system 104 can include performing one or more pre-determined sequences of the one or more action buttons and/or the one or more omnidirectional control sticks or buttons by the members of the audience 106.

In the exemplary embodiment illustrated in FIG. 2, the portable electronic devices 208 can generate action information relating to the one or more pressings of the one or more action buttons and/or one or more movements of the one or more omnidirectional control sticks or buttons by the members of the audience 106 in performing the one or more requisite actions conveyed by the audio/visual system 104. In some embodiments, the action information can identify which action buttons from among the one or more action buttons have been pressed by the members of the audience 106 and/or which omnidirectional control sticks from among the one or more omnidirectional control sticks or buttons have been moved the by members of the audience 106. In these embodiments, the action information can identify specific directions of the movement of the one or more omnidirectional control sticks or button by the members of the audience 106. In some embodiments, this action information can include one or more timestamps indicating one or more instances in time when the one or more action buttons have been pressed by the members of the audience 106 and/or the one or more omnidirectional control sticks have been moved the by members of the audience 106.

After generating the action information, the portable electronic devices 208 can estimate the accuracy and/or for synchronization of the one or more response actions of the members of the audience 106 in relation to the one or more requisite actions conveyed by the audio/visual system 104. In the exemplary embodiment illustrated in FIG. 2, the portable electronic devices 208 can time-shift the one or more response actions of the members of the audience 106 by their corresponding flight times to compensate for the different instances in time that the one or more requisite actions reached the members of the audience 106 in a substantially similar manner as the content server 102 described above in FIG. 1. In some embodiments, the portable electronic devices 208 can request the flight times, which are estimated by the content server 202 as described above, from the content server. In these embodiments, the content server 202 can store a flight time database that includes different flight times for different locations within the venue. In these embodiments, the portable electronic devices 108 can communicate their locations within the venue 200 to the content server 202 and thereafter receive the flight times corresponding to their locations from the content server 202.

After compensating for the different instances in time, the portable electronic devices 208 can thereafter grant the members of the audience 106 various awards for accuracy and/or for synchronization of their time-shifted response actions in relation to the one or more requisite actions conveyed by the audio/visual system 104. In some embodiments, the content server 202 can communicate the response action timeline, as described above in FIG. 1, specifying the one or more requisite actions to be performed by the members of the audience 106 and/or a timeline when these actions is to be performed by the members of the audience 106 to the portable electronic devices 208. In some embodiments, the response action timeline stored by the content server 202 can be relative to an initial time, or a start time, when the audio/visual system 104 commences to convey the one or more requisite actions. In these embodiments, the content server 202 can communicate the response action timeline and the initial time, or the start time, to the portable electronic devices 208. In some embodiments, the portable electronic devices 208 can compare the time-shifted response actions to the response action timeline to determine the accuracy and/or the synchronization of the time-shifted response actions in relation to the one or more requisite actions conveyed by the audio/visual system 104. In some embodiments, these awards can include points or even specialized awards provided by the venue 200 ranging from free items at the venue 200 to free admission to a future event. In some embodiments, the portable electronic devices 208 can communicate these awards to the audio/visual system 104 and/or can display these awards to the members of the audience 106.

Figure 3A:
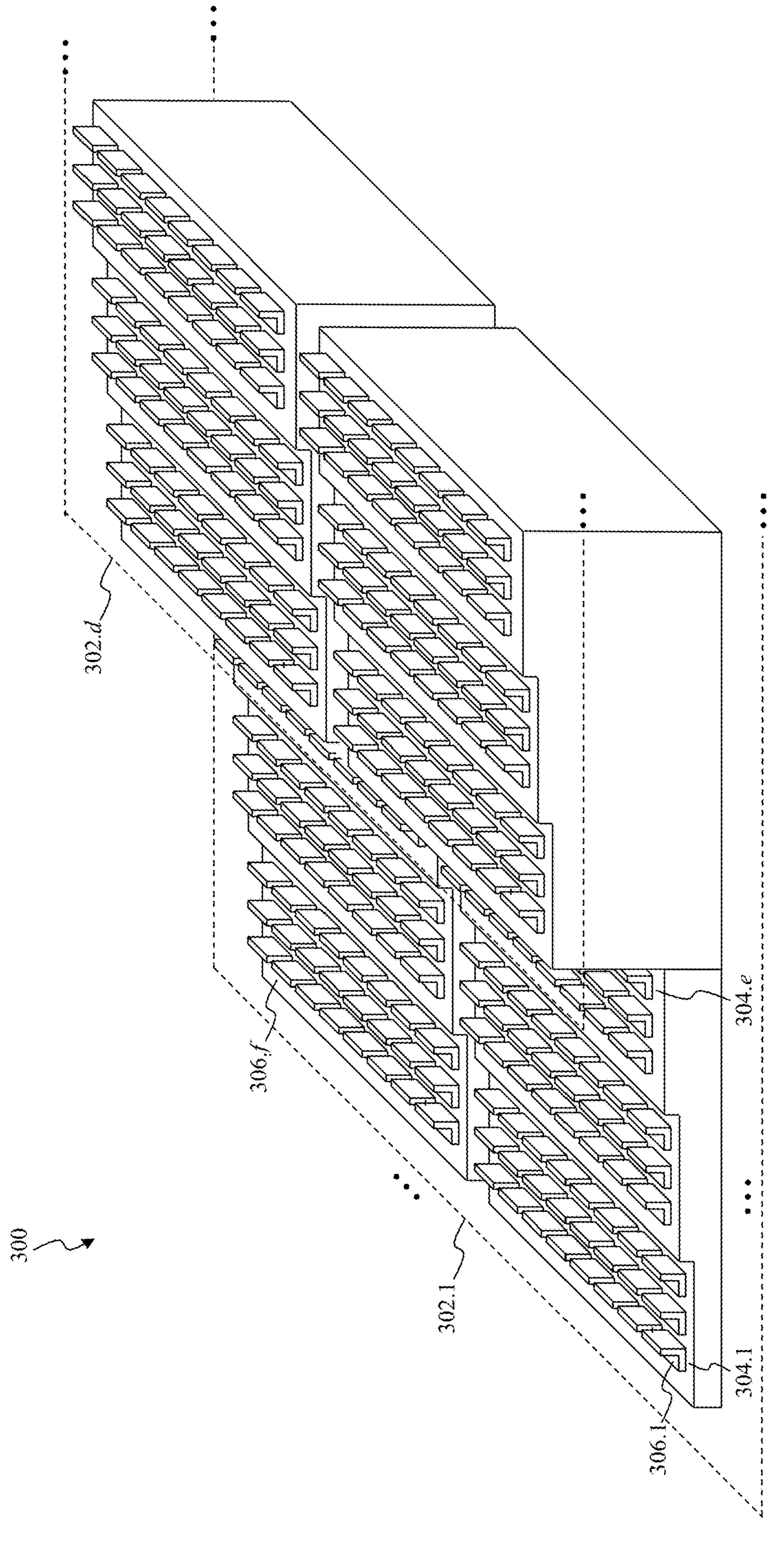
FIG. 3A and FIG. 3B illustrate pictorial representations of exemplary venues in accordance with some exemplary embodiments of the present disclosure.
Figure 3B:
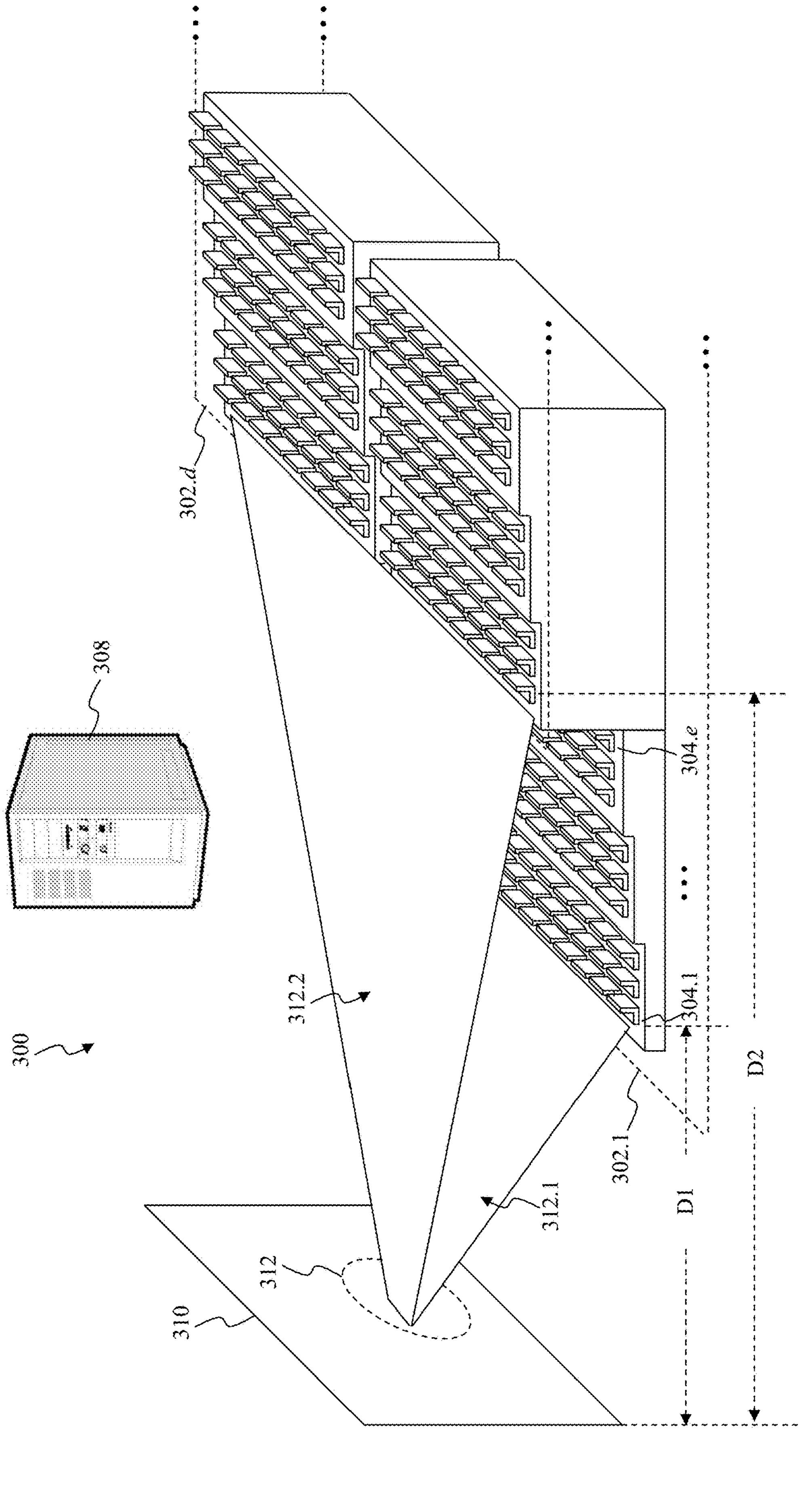

Exemplary Calibration Routines that May be Performed with in the Exemplary First Venue and/or the Exemplary Second Venue FIG. 3A and FIG. 3B illustrate pictorial representations of exemplary venues in accordance with some exemplary embodiments of the present disclosure. In the exemplary embodiment illustrated in FIG. 2, a venue 300 represents a location for hosting an event. For example, the venue 300 can represent a music venue, for example, a music theater, a music club, and/or a concert hall, a sporting venue, for example, an arena, a convention center, and/or a stadium, and/or any other suitable venue that will be apparent to those skilled in the relevant art(s) without departing the spirit and scope of the present disclosure. The event can represent a musical event, a theatrical event, a sporting event, a motion picture, and/or any other suitable event that will be apparent to those skilled in the relevant art(s) without departing the spirit and scope of the present disclosure. The venue 300 can represent an exemplary embodiment of the venue 100 as described above in FIG. 1.

In the exemplary embodiment illustrated in FIG. 3A, the venue 300 includes one or more seating sections 302.1 through **302.*d* to seat an audience, such as the audience 106 as described above in FIG. 1 to provide an example, to view the event. In some embodiments, the seating sections 302.1 through 302.*d* represent different seating sections at different heights for viewing the event. As illustrated in FIG. 3A, the seating section 302.1 represents a lower seating section for viewing the event and the seating section 302.*d* represents an upper seating section above the seating section 302.1 for viewing the event. The seating sections 302.1 through 302.*d* include rows of seats 304.1 through 304.*e* for seating the audience to view the event. In some embodiments, the rows of seats 304.1 through 304.*e* represent different rows of seats at different heights for viewing the event. As illustrated in FIG. 3A, the row of seats 304.1 represents a lower row of seats for viewing the event and the row of seats 304.*e* represents an upper row of seats above the row of seats 304.1 for viewing the event. As illustrated in FIG. 3A, the rows of seats 304.1 through 304.*e* include seats 306.1 through 306*f* for seating the audience to view the event. Although the discussion of FIG. 3A through FIG. 3B to follow is to be described in terms of the venue 300**, those skilled in the relevant art(s) will recognize the teachings herein are similarly applicable to other venues having more or less seating sections, more or less rows of seats, and/or more or less seats without departing from the spirit and scope of the present disclosure.

As illustrated in FIG. 3B, the venue 300 can further include a content server 308 and an audio/visual system 310.

The content server 308 and the audio/visual system 310 can represent exemplary embodiments of the content server 102 and the audio/visual system 104, respectively, as described above in FIG. 1. The content server 308 can provide the interactive content to the audio/visual system 310 for presentation to the members of the audience in a substantially similar manner as described above in FIG. 1. As described above, the interactive content can convey one or more requisite actions to be performed by the members of the audience. In some embodiments, the one or more requisite actions can include pressing one or more pre-determined sequences of one or more action buttons and/or one or more omnidirectional control sticks or buttons on one or more portable electronic devices, such as the portable electronic devices 108 as described above to provide an example, at precise times to provide an example.

In the exemplary embodiment illustrated in FIG. 3B, the audio/visual system 310 can present the visual representations and/or the audible representations of the one or more requisite actions to be performed by the members of the audience in a substantially similar manner as described above in FIG. 1 and FIG. 2. As illustrated in FIG. 3B, the visual representations and/or the audible representations propagate from the audio/visual system 310 onto the members of the audience in a substantially similar manner as described above in FIG. 1 and FIG. 2. In some embodiments, the visual representations can propagate at a much faster velocity, namely, at the speed of light, as compared to the audible representations, namely, at the speed of sound. As such, the different instances in time that the members of the audience can receive the visual representations can be characterized as being negligible when considering the distance between the audio/visual system 310 and the members of the audience relative to the speed of light. In some embodiments, the content server 308 can ignore the different instances in time that the members of the audience receive the visual representations as these different instances in time typically do not significantly impact the accuracy and/or the synchronization of the one or more response actions of the members of the audience in relation to the one or more requisite actions conveyed by the audio/visual system 310. In these embodiments, the different instances in time that the members of the audience receive the audible representations can be characterized as noticeably impacting the accuracy and/or the synchronization of the one or more response actions of the members of the audience in relation to the one or more requisite actions conveyed by the audio/visual system 310 when considering the distance between the audio/visual system 310 and the members of the audience relative to the speed of sound. As such, the content server 308 can effectively compensate for the different instances in time that the audible representations reach the members of the audience.

As illustrated in FIG. 3B, the audio/visual system 310 can present an audible representation 312 of the one or more requisite actions to be performed by the members of the audience. As a matter of convenience and for exemplary purposes only, the audible representation 312 can include a first audible representation 312.1 and a second audible representation 312.2 that propagate from the audio/visual system 310 onto a first row of seats from among the seats 304.1 through 304.*e* of a first seating section 302.1 from among the seating sections 302.1 through 302.*d* and a second row of seats from among the seats 304.1 through 304.*e* of a second seating section 302.*d* from among the seating sections 302.1 through 302.*d*, respectively. In the exemplary embodiment illustrated in FIG. 3B, the first row of seats is situated approximately at a distance D1 from the audio/visual system 310 and the second row of seats is situated approximately at a distance D2 from the audio/visual system 310. In some embodiments, the distance D1 and/or the distance D2 can be stored in the content server 308 and thereafter retrieved by the content server 308. In some embodiments, the content server 308 can mathematically approximate the distance D1 and/or the distance D2 using, for example, using a Pythagoras Theorem distance formula. In these embodiments, the three-dimensional locations, for example, the x, y, and z locations on a Cartesian coordinate system, of the first row of seats and/or the second row of seats can be estimated as described above in FIG. 1. In these embodiments, the distance D1 and/or the distance D2 can be approximated by:

$$d=\sqrt{\Delta x^2+\Delta y^2+\Delta z^2} \tag{1}$$

where d represents the distance D1 and/or the distance D2 and x, y, and z represent the three-dimensional locations of the first row of seats and/or the second row of seats. In some embodiments, the content server 308 can mathematically approximate the distance D1 and/or the distance D2 using, for example, using spherical trigonometry. In these embodiments, the content server 308 can mathematically approximate the distance D1 and/or the distance D2 using, for example, using the haversine formula. In some embodiments, the content server 308 can utilize the spherical trigonometry to estimate the distance D1 and/or the distance D2 when the venue floorplan, as described above in FIG. 1, is unavailable and/or the portable electronic devices 108 are moving about the venue 300.

In the exemplary embodiment illustrated in FIG. 3B, the content server 308 can estimate the audible flight time that the first audible representation 312.1 arrives at the first row of seats as approximately:

$$T1=\frac{D1}{v_{sound}}\text{seconds,} \tag{2}$$

and can estimate the audible flight time that the second audible representation 312.2 arrives at the second row of seats as approximately:

$$T2=\frac{D2}{v_{sound}}\text{seconds,} \tag{3}$$

where T1 and T2 represent audible flight times of the first audible representation 312.1 and the second audible representation 312.2, respectively, D1 and D2 represent the distance D1 and the distance D2 as described above, and $v_{sound}$ represents the speed of sound. Typically, the speed of sound in air is approximate three hundred forty-three (343) meters per second at twenty (20) degrees Celsius which can vary depending up the temperature of the venue 300. In some embodiments, a difference between the audible flight time T1 and the audible flight time T2 can be on the order of milliseconds (ms) which can noticeably impact the accuracy and/or the synchronization of the one or more response actions of the members of the audience in relation to the one or more requisite actions conveyed by the audio/visual system 310. In some embodiments, the difference between the audible flight time T1 and the audible flight time T2 can be as much as approximately 400 ms for a ninety (90) meter distance between the first row of seats and the second row of seats.

In the exemplary embodiment illustrated in FIG. 3B, the content server 308 can determine various other audible flight times from the audio/visual system 310 to various locations within the venue, such as one or more seats, one or more rows, one or more sections, and/or elsewhere within the venue, in a substantially similar manner. In some embodiments, the content server 308 can store these audible flight times into a flight time database that can be later accessed by the content server 308 to estimate the audible flight times for these various locations within the venue.

In the exemplary embodiment illustrated in FIG. 3B, the audible flight times determined by the content server 308 can be characterized as being relative to the audio/visual system 310. However, in some embodiments, those skilled in the relevant art(s) will recognize that the audible flight times determined by the content server 308 can be characterized as being relative other locations within the venue, for example, the first row of seats and/or the second row of seats. In these embodiments, differences between audible flight times, for example, a difference between the audible flight time T1 and the audible flight time T2, can alternatively, or additionally, be used to compensate for the different instances in time that the members of the audience received the audible representations.

Figure 4:
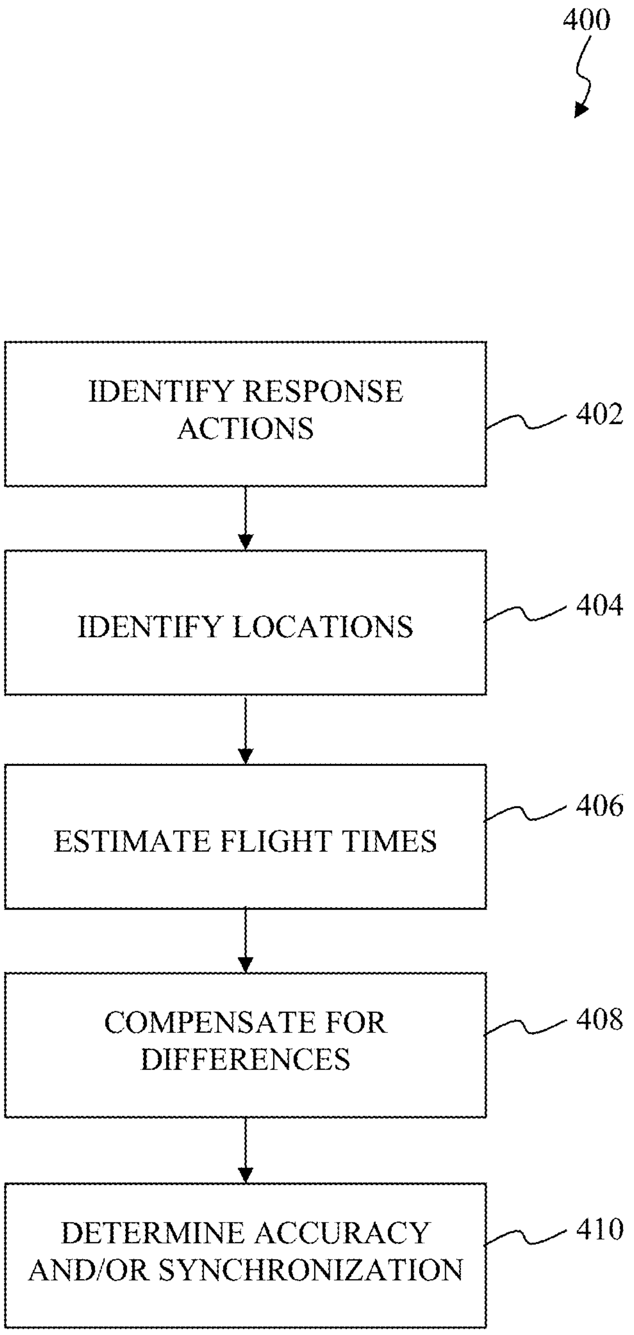
FIG. 4 illustrates a flowchart of an exemplary calibration operation according to some exemplary embodiments of the present disclosure.

Exemplary Calibration Operation that can be Implemented within the Content Server FIG. 4 illustrates a flowchart of an exemplary calibration operation according to some exemplary embodiments of the present disclosure. The disclosure is not limited to this operational description. Rather, it will be apparent to ordinary persons skilled in the relevant art(s) that other operational control flows are within the scope and spirit of the present disclosure. The following discussion describes an exemplary operational control flow 400 for compensating for different audible flight times that various audible representations of one or more requisite actions to be performed by members of an audience are received by the members of the audience. The operational control flow 400 as to be described in further detail below can be executed by one or more computer systems, such as the content server 102 as described above in FIG. 1, the content server 202 as described above in FIG. 2, and/or the content server 308 as described above in FIG. 3A and FIG. 3B.

At operation 402, the operational control flow 400 identifies one or more response actions relating to, for example, hand-eye coordination and/or reaction-time, which are performed by the members of the audience in response to the one or more requisite actions. In some embodiments, the operational control flow 400 can execute interactive content to convey, for example, using the visual and/or the audible representations, the one or more requisite actions to be performed by the members of the audience in a substantially similar manner as described above in FIG. 1, FIG. 2, FIG. 3A, and FIG. 3B. In some embodiments, the members of the audience can manipulate portable electronic devices, such as the portable electronic devices 108 as described above in FIG. 1, FIG. 2, FIG. 3A, and FIG. 3B to provide an example, to perform the one or more requisite actions conveyed by the interactive content. In these embodiments, the members of the audience 106 can manipulate, for example, move or press, one or more action buttons and/or one or more omnidirectional control sticks or buttons of the portable electronic devices to perform the one or more requisite actions conveyed by the interactive content. In some embodiments, the one or more requisite actions can include performing one or more pre-determined sequences of the one or more action buttons and/or the one or more omnidirectional control sticks or buttons by the members of the audience. In these embodiments, the operational control flow 400 can identify which action buttons from among the one or more action buttons have been pressed by the members of the audience and/or which omnidirectional control sticks from among the one or more omnidirectional control sticks or buttons have been moved the by members of the audience. In these embodiments, the operational control flow 400 can identify specific directions of the movement of the one or more omnidirectional sticks or button by the members of the audience. In some embodiments, the operational control flow 400 can identify one or more timestamps indicating one or more instances in time when the one or more action buttons have been pressed by the members of the audience and/or the one or more omnidirectional control sticks have been moved the by members of the audience. In some embodiments, operation 402 can be performed by the content server 102 as described above in FIG. 1 and/or the portable electronic devices 208 as described above in FIG. 2.

At operation 404, the operational control flow 400 can identify locations of the portable electronic devices within the venue in a substantially similar manner as described above in FIG. 1 and/or FIG. 2.

At operation 406, the operational control flow 400 estimates one or more audible durations in time, referred to as audible flight times, of the audible representations for the portable electronic devices based upon their identified locations from operation 404. In the exemplary embodiment illustrated in FIG. 4, the operational control flow 400 can access a flight time database that identifies the audible flight times for one or more characteristics, parameters, and/or attributes of the venue, such as one or more seats, one or more rows, one or more sections, and/or elsewhere within the venue. In some embodiments, the flight time database can include various entries having the audible flight times corresponding to one or more seats, one or more rows, one or more sections, and/or elsewhere within the venue. In some embodiments, the operational control flow 400 can select the audible flight times of the audible representations for the portable electronic devices from the flight time database that correspond to their identified locations from operation 404. In some embodiments, operation 406 can be performed by the content server 102 as described above in FIG. 1 and/or the content server 202 as described above in FIG. 2.

At operation 408, the operational control flow 400 can time-shift the one or more response actions of the members of the audience from operation 402 by their corresponding audible flight times from operation 406 to compensate for the different instances in time that the members of the audience received the audible representations. As described above, the members of the audience can receive the audible representations presented by the interactive content at different instances in time. For example, those members that are seated further away from the interactive content can receive the audible representations at later instances in time than those members that are seated closer to the interactive content. As a result, those members that are seated further away from the interactive content often perform their response actions later in time which can effectively diminish accuracy and/or synchronization of their response actions to the one or more requisite actions conveyed by the interactive content. The operational control flow 400 can effectively compensate for these different instances in time at operation 408 such that the accuracy and/or the synchronization of the one or more response actions of the members of the audience can be characterized as no longer being dependent upon their distance from the interactive content by time-shifting the one or more response actions of the members of the audience from operation 402 by their corresponding audible flight times from operation 406. In some embodiments, the operational control flow 400 can reduce, or subtract, the timestamps of the one or more response actions of the members of the audience of operation 402 from the one or more audible flight times to compensate for the different instances in time.

At operation 410, the operational control flow 400 can estimate the accuracy and/or for synchronization of the one or more response actions of the members of the audience in relation to the one or more requisite actions conveyed by the interactive content in a substantially similar manner as described above in FIG. 1 and/or FIG. 2. In some embodiments, the operational control flow 400 can compare a response action timeline specifying the one or more requisite actions to be performed by the members of the audience 106 and/or a timeline when these actions is to be performed by the members of the audience 106 to the time-shifted response actions from operation 408 to determine the accuracy and/or the synchronization of the time-shifted response actions from operation 408 in relation to the one or more requisite actions. In some embodiments, the operational control flow 400 can thereafter grant the members of the audience various awards for accuracy and/or for synchronization of their time-shifted response actions in relation to the one or more requisite actions conveyed by the interactive content. In some embodiments, these awards can include points or even specialized awards provided by the venue ranging from free items at the venue to free admission to a future event. In some embodiments, the operational control flow 400 can communicate these awards to the interactive content and/or the portable electronic devices for display to the members of the audience.

FIG. 5 graphically illustrates the exemplary calibration operation according to some exemplary embodiments of the present disclosure. As described above, interactive content can solicit participation from a member of the audience to perform one or more response actions relating to, for example, hand-eye coordination and/or reaction-time. In the exemplary embodiment illustrated in FIG. 5, a content server, such as the content server 102 as described above in FIG. 1, the content server 202 as described above in FIG. 2, and/or the content server 308 as described above in FIG. 3A and FIG. 3B to provide some examples, can provide interactive content to an audio/visual system, such as the audio/visual system 104 as described above in FIG. 1 and/or FIG. 2, and/or the audio/visual system 310 as described above in FIG. 3A and FIG. 3B to provide some examples. As illustrated in FIG. 5, the interactive content can convey requisite actions $A_1$ through $A_M$ to be performed by the member of the audience within a venue, such as the within the venue 100 as described above in FIG. 1, the venue 200 as described above in FIG. 2, and and/or the within the venue 300 as described above in FIG. 3A and FIG. 3B to provide some examples, at different instances in time t. In some embodiments, the requisite actions $A_1$ through $A_M$ can include pressing one or more pre-determined sequences of one or more action buttons and/or one or more omnidirectional control sticks or buttons of a portable electronic devices, such as one of the portable electronic devices 108 as described above in FIG. 1, at precise times to provide an example. In the exemplary embodiment illustrated in FIG. 1, the audio/visual system 104 can present the visual representations and/or the audible representations of the one or more requisite actions to be performed by the member of the audience.

In the exemplary embodiment illustrated in FIG. 5, the portable electronic device can be manipulated by the member of the audience to provide response actions $R_1$ through $R_M$ in response to the requisite actions $A_1$ through $A_M$ at different instances in time t. In some embodiments, the portable electronic device can include the one or more action buttons and/or the one or more omnidirectional control sticks or buttons that can be manipulated by the member of the audience provide the response actions $R_1$ through $R_M$ to the requisite actions $A_1$ through $A_M$ at the different instances in time t. As described above, the interactive content can convey the requisite actions $A_1$ through $A_M$ to the member of the audience through various visual representations and/or audible representations. As described above, the member of the audience can receive the visual representations and/or the audible representations presented by the interactive content at different instances in time which can significantly impact the accuracy and/or the synchronization of the response actions $R_1$ through $R_M$ in relation to the requisite actions $A_1$ through $A_M$. As illustrated in FIG. 5, the audience member effectively performs the response actions $R_1$ through $R_M$ to the requisite actions $A_1$ through $A_M$ within response times $t_1$ through $t_M$. In the exemplary embodiment illustrated in FIG. 5, the response times $t_1$ through $t_M$ represent combinations of member response times $\Delta r_1$ through $\Delta r_M$ and a flight time $\Delta t$. In some embodiments, the member response times $\Delta r_1$ through $\Delta r_M$ represent durations in time needed by the audience member to perform the response actions $R_1$ through $R_M$. In some embodiments, member response times $\Delta r_1$ through $\Delta r_M$ can differ among members of the audience based upon, for example, hand-eye coordination and/or reaction-time. In some embodiments, the flight time $\Delta t$ represents a duration in time need for the visual representations and/or the audible representations of the requisite actions $A_1$ through $A_M$ to reach the member of the audience and can be based upon the location of the member within the venue as described above in FIG. 1, FIG. 2, FIG. 3A, and FIG. 3B. In these embodiments, the content server can estimate the flight time $\Delta t$ as described above in FIG. 1, FIG. 2, FIG. 3A, and FIG. 3B.

In the exemplary embodiment illustrated in FIG. 5, the content server can time-shift the response actions $R_1$ through $R_M$ by the flight time $\Delta t$ to provide time-shifted response actions $r_1$ through $r_M$. In some embodiments, the content server can reduce, or subtract, the flight time $\Delta t$ from the response actions $R_1$ through $R_M$ to provide the time-shifted response actions $r_1$ through $r_M$. As such, the time-shifted response actions $r_1$ through $r_M$ can be characterized as being no longer being dependent upon the flight time $\Delta t$ that can noticeably impacting the accuracy and/or the synchronization of the response actions $R_1$ through $R_M$ in relation to the requisite actions $A_1$ through $A_M$. In some embodiments, the content server can thereafter estimate the accuracy and/or for synchronization of the time-shifted response actions $r_1$ through $r_M$ in relation to relation to the requisite actions $A_1$ through $A_M$ and can thereafter grant the member of the audience various awards for accuracy and/or for synchronization of the time-shifted response actions $r_1$ through $r_M$ to the requisite actions $A_1$ through $A_M$ as described above.

Exemplary Computer System that can be Utilized to Implement Electronic Devices within the Exemplary First Venue FIG. 6 graphically illustrates a simplified block diagram of a computer system suitable for use with embodiments described herein according to some exemplary embodiments of the present disclosure. The various electronic devices, for example, the content server 102 as described above in FIG. 1, the content server 202 as described above in FIG. 2, and/or the content server 308 as described above in FIG. 3A and FIG. 3B, can be implemented in hardware, firmware, software, or any combination thereof. The discussion of FIG. 6 to follow describes an exemplary computer system 610 that can be used for these electronic devices.

In the exemplary embodiment illustrated in FIG. 6, the computer system 610 typically includes at least one processor 614 which communicates with a number of peripheral devices via bus subsystem 612. Typically, the at least processor 614 can include, or can be, any of a microprocessor, graphics processing unit, or digital signal processor, and their electronic processing equivalents, such as an Application Specific Integrated Circuit ("ASIC") or Field Programmable Gate Array ("FPGA"). As used herein, the term "processor" signifies a tangible data and information processing device that physically transforms data and information, typically using a sequence transformation (also referred to as "operations"). Data and information can be physically represented by an electrical, magnetic, optical or acoustical signal that is capable of being stored, accessed, transferred, combined, compared, or otherwise manipulated by the processor. The term "processor" can signify a singular processor and multi-core systems or multi-processor arrays, including graphic processing units, digital signal processors, digital processors or combinations of these elements. The processor can be electronic, for example, comprising digital logic circuitry (for example, binary logic), or analog (for example, an operational amplifier). The processor may also operate to support performance of the relevant operations in a "cloud computing" environment or as a "software as a service" (SaaS). For example, at least some of the operations may be performed by a group of processors available at a distributed or remote system, these processors accessible via a communications network (e.g., the Internet) and via one or more software interfaces (e.g., an application program interface (API).)

The computer system typically includes an operating system, such as Microsoft's Windows, Sun Microsystems's Solaris, Apple Computer's MacOs, Linux or UNIX. The computer system also typically can include a Basic Input/Output System (BIOS) and processor firmware. The operating system, BIOS and firmware are used by the processor to control subsystems and interfaces coupled to the processor. Typical processors compatible with these operating systems include the Pentium and Itanium from Intel, the Opteron and Athlon from Advanced Micro Devices, and the ARM processor from ARM Holdings.

As illustrated in FIG. 6, these peripheral devices may include a storage subsystem 624, comprising a memory subsystem 626 and a file storage subsystem 628, user interface input devices 622, user interface output devices 620, and a network interface subsystem 616. The input and output devices allow user interaction with computer system 610. In the exemplary embodiment illustrated in FIG. 6, the network interface subsystem 616 provides an interface to outside networks, including an interface to a communication network 618, and is coupled via a communication network 618 to corresponding interface devices in other computer systems or machines. The communication network 618 may comprise many interconnected computer systems, machines and communication links. These communication links may be wired links, optical links, wireless links, or any other devices for communication of information. The communication network 618 can be any suitable computer network, for example a wide area network such as the Internet, and/or a local area network such as Ethernet. The communication network 618 can be wired and/or wireless, and the communication network can use encryption and decryption methods, such as is available with a virtual private network. The communication network uses one or more communications interfaces, which can receive data from, and transmit data to, other systems. Embodiments of communications interfaces typically include an Ethernet card, a modem (e.g., telephone, satellite, cable, or ISDN), (asynchronous) digital subscriber line (DSL) unit, Firewire interface, USB interface, and the like. One or more communications protocols can be used, such as HTTP, TCP/IP, RTP/RTSP, IPX and/or UDP.

The user interface input devices 622 may include an alphanumeric keyboard, a keypad, pointing devices such as a mouse, trackball, touchpad, stylus, or graphics tablet, a scanner, a touchscreen incorporated into the display, audio input devices such as voice recognition systems or microphones, eye-gaze recognition, brainwave pattern recognition, and other types of input devices. Such devices can be connected by wire or wirelessly to a computer system. In general, use of the term "input device" is intended to include all possible types of devices and ways to input information into the computer system 610 or onto the communication network 618. The user interface input devices 622 typically allow a user to select objects, icons, text and the like that appear on some types of user interface output devices, for example, a display subsystem.

The user interface output devices 620 may include a display subsystem, a printer, a fax machine, or non-visual displays such as audio output devices. The display subsystem may include a cathode ray tube (CRT), a flat-panel device such as a liquid crystal display (LCD), a projection device, or some other device for creating a visible image such as a virtual reality system. The display subsystem may also provide non-visual display such as via audio output or tactile output (e.g., vibrations) devices. In general, use of the term "output device" is intended to include all possible types of devices and ways to output information from the computer system 610 to the user or to another machine or computer system.

The memory subsystem 626 typically includes a number of memories including a main random-access memory ("RAM") 640 (or other volatile storage device) for storage of instructions and data during program execution and a read only memory ("ROM") 632 in which fixed instructions are stored. The file storage subsystem 628 provides persistent storage for program and data files, and may include a hard disk drive, a floppy disk drive along with associated removable media, a CD-ROM drive, an optical drive, a flash memory, or removable media cartridges. The databases and modules implementing the functionality of certain embodiments may be stored by file storage subsystem 628.

The bus subsystem 612 provides a device for letting the various components and subsystems of the computer system 610 communicate with each other as intended. Although the bus subsystem 612 is shown schematically as a single bus, alternative embodiments of the bus subsystem may use multiple busses. For example, RAM-based main memory can communicate directly with file storage systems using Direct Memory Access ("DMA") systems.

CONCLUSION

The Detailed Description referred to accompanying figures to illustrate exemplary embodiments consistent with the disclosure. References in the disclosure to "an exemplary embodiment" indicates that the exemplary embodiment described can include a particular feature, structure, or characteristic, but every exemplary embodiment may not necessarily include the particular feature, structure, or characteristic. Moreover, such phrases are not necessarily referring to the same exemplary embodiment. Further, any feature, structure, or characteristic described in connection with an exemplary embodiment can be included, independently or in any combination, with features, structures, or characteristics of other exemplary embodiments whether or not explicitly described.

The Detailed Description is not meant to limiting. Rather, the scope of the disclosure is defined only in accordance with the following claims and their equivalents. It is to be appreciated that the Detailed Description section, and not the Abstract section, is intended to be used to interpret the claims. The Abstract section can set forth one or more, but not all exemplary embodiments, of the disclosure, and thus, are not intended to limit the disclosure and the following claims and their equivalents in any way.

The exemplary embodiments described within the disclosure have been provided for illustrative purposes and are not intended to be limiting. Other exemplary embodiments are possible, and modifications can be made to the exemplary embodiments while remaining within the spirit and scope of the disclosure. The disclosure has been described with the aid of functional building blocks illustrating the implementation of specified functions and relationships thereof. The boundaries of these functional building blocks have been arbitrarily defined herein for the convenience of the description. Alternate boundaries can be defined so long as the specified functions and relationships thereof are appropriately performed.

Embodiments of the disclosure can be implemented in hardware, firmware, software application, or any combination thereof. Embodiments of the disclosure can also be implemented as instructions stored on a machine-readable medium, which can be read and executed by one or more processors. A machine-readable medium can include any mechanism for storing or transmitting information in a form readable by a machine (e.g., a computing circuitry). For example, a machine-readable medium can include non-transitory machine-readable mediums such as read only memory (ROM); random access memory (RAM); magnetic disk storage media; optical storage media; flash memory devices; and others. As another example, the machine-readable medium can include transitory machine-readable medium such as electrical, optical, acoustical, or other forms of propagated signals (e.g., carrier waves, infrared signals, digital signals, etc.). Further, firmware, software application, routines, instructions can be described herein as performing certain actions. However, it should be appreciated that such descriptions are merely for convenience and that such actions in fact result from computing devices, processors, controllers, or other devices executing the firmware, software application, routines, instructions, etc.

The Detailed Description of the exemplary embodiments fully revealed the general nature of the disclosure that others can, by applying knowledge of those skilled in relevant art(s), readily modify and/or adapt for various applications such exemplary embodiments, without undue experimentation, without departing from the spirit and scope of the disclosure. Therefore, such adaptations and modifications are intended to be within the meaning and plurality of equivalents of the exemplary embodiments based upon the teaching and guidance presented herein. It is to be understood that the phraseology or terminology herein is for the purpose of description and not of limitation, such that the terminology or phraseology of the present specification is to be interpreted by those skilled in relevant art(s) in light of the teachings herein.

What is claimed is:

1. A venue for providing interactive content to an audience, the venue comprising:

an audio/visual system configured to present a rhythm video game to the audience, the rhythm video game conveying an audible representation of a requisite action to be performed by a plurality of members of the audience; and a content server configured to:

receive a plurality of response actions that were performed by the plurality of members of the audience in response to the audible representation of the requisite action reaching the plurality of members of the audience using a plurality of portable electronic devices, identify a plurality of locations of the plurality of portable electronic devices within the venue, estimate a plurality of audible flight times for the audible representation of the requisite action to reach the plurality of members of the audience based upon the plurality of locations of the plurality of portable electronic devices, time-shift the plurality of response actions by their corresponding audible flight times from among the plurality of audible flight times to provide a plurality of time-shifted plurality of response actions, and grant the plurality of members of the audience one or more awards based upon synchronization of the plurality of time-shifted plurality of response actions in relation to the requisite action.

2. The venue of claim 1, wherein the requisite action to be performed by the plurality of members of the audience comprises:

pressing a pre-determined sequence of one or more action buttons or one or more omnidirectional control sticks or buttons on the plurality of portable electronic devices, and wherein the plurality of response actions that were performed by the plurality of members of the audience comprise:

pressing the pre-determined sequence of the one or more action buttons or the one or more omnidirectional control sticks or buttons on the plurality of portable electronic devices.

3. The venue of claim 1, wherein the content server is further configured to:

receive a plurality of characteristics, parameters, and/or attributes relating to a plurality of seating arrangements of the plurality of members of the audience within the venue; and compare the plurality of characteristics, parameters, and/or attributes with a venue floorplan that associates the plurality of characteristics, parameters, and/or attributes with their corresponding locations within the venue to identify the plurality of locations of the plurality of portable electronic devices within the venue.

4. The venue of claim 1, wherein the content server is further configured to receive global positioning information from the plurality of portable electronic devices relating to the plurality of locations of the plurality of portable electronic devices within the venue.

5. The venue of claim 1, wherein the content server is further configured to:

determine a plurality of distances between the audio/visual system and the plurality of locations of the plurality of portable electronic devices within the venue; and estimate the plurality of audible flight times for the audible representation of the requisite action based upon a ratio between the plurality of distances and a speed of sound.

6. The venue of claim 1, wherein the audible representation of the requisite action reaches those members of the audience from among the plurality of members of the audience that are further away from the audio/visual system at later instances in time than those members of the audience from among the plurality of members of the audience that are closer to the audio/visual system.

7. The venue of claim 1, wherein the content server is further configured to:

store a response action timeline specifying the requisite action to be performed by the plurality of members of the audience and a timeline of the requisite action to be performed by the plurality of members of the audience; and compare the plurality of time-shifted plurality of response actions to the timeline of the requisite action to determine the synchronization of the plurality of time-shifted plurality of response actions in relation to the requisite action.

8. A method for providing interactive content to an audience, the method comprising:

receiving, by a content server, a plurality of response actions that were performed by a plurality of members of the audience using a plurality of portable electronic devices, the plurality of response actions being performed by the plurality of members of the audience in response to the interactive content conveying an audible representation of a requisite action to be performed by the plurality of members of the audience reaching the plurality of members of the audience;

identifying, by the content server, a plurality of locations of the plurality of portable electronic devices within a venue;

estimating, by the content server, a plurality of audible flight times for the audible representation of the requisite action to reach the plurality of members of the audience based upon the plurality of locations of the plurality of portable electronic devices;

time-shifting, by the content server, the plurality of response actions that were performed by the plurality of members of the audience by their corresponding audible flight times from among the plurality of audible flight times to provide a plurality of time-shifted plurality of response actions;

and estimating, by the content server, accuracy or synchronization of the plurality of time-shifted plurality of response actions that were performed by the plurality of members of the audience in relation to the requisite action to be performed by the plurality of members of the audience.

9. The method of claim 8, wherein the plurality of response actions that were performed by the plurality of members of the audience comprises:

pressing a pre-determined sequence of one or more action buttons or one or more omnidirectional control sticks or buttons on the plurality of portable electronic devices, and wherein the requisite action to be performed by the plurality of members of the audience comprises:

pressing the pre-determined sequence of the one or more action buttons or the one or more omnidirectional control sticks or buttons on the plurality of portable electronic devices.

10. The method of claim 8, wherein the identifying comprises:

receiving a plurality of characteristics, parameters, and/or attributes relating to a plurality of seating arrangements of the plurality of members of the audience within the venue; and comparing the plurality of characteristics, parameters, and/or attributes with a venue floorplan that associates the plurality of characteristics, parameters, and/or attributes with their corresponding locations within the venue to identify the plurality of locations of the plurality of portable electronic devices within the venue.

11. The method of claim 8, wherein the identifying comprises:

receive global positioning information relating to the plurality of locations of the plurality of portable electronic devices within the venue from the plurality of portable electronic devices.

12. The method of claim 8, wherein the interactive content comprises:

a rhythm video game.

13. The method of claim 8, wherein the estimating comprises:

storing, by the content server, a response action timeline specifying the requisite action to be performed by the plurality of members of the audience and a timeline of the requisite action to be performed by the plurality of members of the audience; and comparing, by the content server, the plurality of time-shifted plurality of response actions to the timeline of the requisite action to estimate the synchronization of the plurality of time- shifted plurality of response actions in relation to the requisite action.

14. A content server for providing interactive content to an audience within a venue, the content server comprising:

a memory that stores instructions; and a processor configured to execute the instructions, the instructions, when executed by the processor, configuring the processor to:

receive a response action that was performed by a member of the audience using a portable electronic device, the response action being performed by the member of the audience in response to the interactive content conveying a requisite action to be performed by the member of the audience reaching the member of the audience, identify a location of the portable electronic device within the venue, estimate a flight time for the requisite action to reach the member of the audience based upon the location, time-shift the response action that was performed by the member of the audience by the flight time to provide a time-shifted response action, and estimate accuracy or synchronization of the time-shifted response action that was performed by the member of the audience in relation to the requisite action to be performed by the member of the audience.

15. The content server of claim 14, wherein the response action that was performed by the member of the audience comprises:

pressing a pre-determined sequence of one or more action buttons or one or more omnidirectional control sticks or buttons on the portable electronic device, and wherein the requisite action to be performed by the member of the audience comprises:

pressing the pre-determined sequence of the one or more action buttons or the one or more omnidirectional control sticks or buttons on the portable electronic device.

16. The content server of claim 14, wherein the instructions, when executed by the processor, configure the processor to:

receive a characteristic, parameter, and/or attribute relating to a seating arrangement of the member of the audience within the venue; and compare the characteristic, parameter, and/or attribute with a venue floorplan that associates the characteristic, parameter, and/or attribute with its corresponding location within the venue to identify the location of the portable electronic device within the venue.

17. The content server of claim 14 wherein the instructions, when executed by the processor, configure the processor to receive global positioning information relating to the location of the portable electronic device within the venue from the portable electronic device.

18. The content server of claim 14, wherein the interactive content comprises:

a rhythm video game.

19. The content server of claim 14, wherein the instructions, when executed by the processor, configure the processor to:

determine a distance between an electronic device presenting the interactive content and the location of the portable electronic device within the venue; and estimate the flight time based upon a ratio between the distance and a speed of the requisite action to reach the member of the audience.

20. The content server of claim 14, wherein the instructions, when executed by the processor, configure the processor to receive the response action that was performed by the member of the audience manipulating the portable electronic device.

* * * * *